United States Patent

Ahlberg et al.

[11] Patent Number: 5,570,413
[45] Date of Patent: Oct. 29, 1996

[54] CELLULAR TELEPHONE AND ASSOCIATED METHOD FOR OPENING A VOICE CHANNEL WITH A SOURCE TELEPHONE WITHOUT ESTABLISHING VOICE COMMUNICATIONS THEREWITH

[75] Inventors: Björn G. D. Ahlberg, Falsterbo; Johan Falk, Järfälla, both of Sweden; Anders Mölne, Cary, N.C.

[73] Assignee: Ericsson Inc., Research Triangle Park, N.C.

[21] Appl. No.: 276,265

[22] Filed: Jul. 18, 1994

[51] Int. Cl.⁶ ...................................... H04Q 7/22
[52] U.S. Cl. ........................... 379/59; 379/142; 379/127; 379/63; 379/247
[58] Field of Search ..................... 379/142, 127, 379/245, 246, 247, 58, 59, 63

[56] References Cited

U.S. PATENT DOCUMENTS

| | | | |
|---|---|---|---|
| 4,893,335 | 1/1990 | Fuller et al. | |
| 5,029,196 | 7/1991 | Morganstein | 379/67 |
| 5,327,486 | 7/1994 | Wolff et al. | 379/58 X |
| 5,329,578 | 7/1994 | Brennan et al. | 379/67 |
| 5,371,781 | 12/1994 | Ardon | 379/59 |

FOREIGN PATENT DOCUMENTS

| | | | |
|---|---|---|---|
| 2193861 | 2/1988 | United Kingdom | 379/61 |
| WO92/14329 | 8/1992 | WIPO | |
| 9326132 | 12/1993 | WIPO | |
| WO93/26132 | 12/1993 | WIPO | |
| WO94/05095 | 3/1994 | WIPO | |

OTHER PUBLICATIONS

International Search Report for PCT/US95/08143 dated Nov. 2, 1995.

*Primary Examiner*—Curtis Kuntz
*Assistant Examiner*—G. J. Oehling
*Attorney, Agent, or Firm*—Bell, Seltzer, Park & Gibson

[57] ABSTRACT

A cellular telephone includes a speaker, a microphone and voice channel establishing components for opening a voice channel between the cellular telephone and a source telephone requesting communications with the cellular telephone without opening the speaker and microphone. Thus, voice communications between the cellular telephone and the source telephone are prevented until a predetermined signal from the user of the cellular telephone is received. The cellular telephone also include delayed speaker and microphone connecting components for receiving and processing data from the source telephone without opening the speaker and the microphone. The data may include the identity of the source telephone or a message which may be displayed for the user of the cellular telephone. Based upon the identity of the source telephone, the user of the cellular telephone may selectively ignore or respond to the request for communications, or may route the request to an automated answering device or another telephone.

16 Claims, 4 Drawing Sheets

CELLULAR TELEPHONE AND ASSOCIATED METHOD FOR OPENING A VOICE CHANNEL WITH A SOURCE TELEPHONE WITHOUT ESTABLISHING VOICE COMMUNICATIONS THEREWITH

FIELD OF THE INVENTION

The present invention relates generally to cellular radio communications.

BACKGROUND OF THE INVENTION

Cellular radio communications systems are commonly employed to provide voice and data communications to a plurality of mobile telephones or subscribers. Analog cellular systems, such as designated AMPS, TACS, E-TACS and NMT have been deployed successfully throughout the world. More recently, digital cellular systems, such as designated IS-54B in North America and the pan-European GSM system as well PDC and DECT cellular systems, have been introduced. These systems, and others, are described, for example, in the book titled *Cellular Radio Systems* by Balston, et al., published by Artech House, Norwood, Mass., 1993.

A cellular radio communications system generally includes one or more stations or units, typically referred to as cellular telephones, one or more base stations and a mobile telephone switching office. A typical cellular radio communications system may include hundreds of base stations, thousands of cellular telephones and more than one mobile telephone switching office. The mobile telephone switching office and the plurality of base stations associated therewith generally define the cellular radio network.

The cellular radio network is typically divided into cells which include one base station and the cellular telephones with which the base station is in communication. Each cell will have allocated to it one or more voice channels and, if the cellular radio network is digital, one or more dedicated digital control channels. For example, a typical cell of a GSM digital cellular radio network has one digital control channel and 21 voice/data or traffic, channels. The digital control channel is a dedicated channel for transmitting cell identification and paging information while the voice channels carry the voice and data information. Note that "channel" may refer to a specific carrier frequency in an analog system or to a specific carrier/slot combination in a hybrid TDMA/FDMA system, such as IS-54B or in GSM.

The mobile telephone switching office is a central coordinating element of the overall cellular radio network. The mobile telephone switching office typically includes a cellular processor and a cellular switch which provides the interface to an associated public switched telephone network. The mobile telephone switching office may also include a Home Location Register. The Home Location Register includes a memory device for storing data relating to the subscribers to the cellular system. This data may include the location of the subscriber as well as any specific services requested by the subscriber, such as call waiting or call hold.

Each base station of a cellular radio network generally includes a control unit and an antenna tower. The control unit comprises the base station electronics including the radio control group, the exchange radio interface, a primary power supply for converting electric power from the AC grid to power the individual components within the base station, and a backup power supply. The exchange radio interface of the control unit of the base station electronics provides signals between the mobile telephone switching office and the base station. For example, the exchange radio interface receives data from the radio channel group and transfers the data to the mobile telephone switching office via a dedicated communications link. In the reverse direction, the exchange radio interface receives data from the mobile telephone switching office into the radio channel group for subsequent transmission to a cellular telephone.

The radio control group includes the electronic equipment necessary to effect radio communications. A radio control group typically includes one transmit/receive module for each voice and control channel as well as one signal strength receiver. Each transmit/receive module includes a transmitter, receiver and control unit. The transmit/receive modules are not typically frequency agile and operate, instead, on only one predetermined channel. Control signals from the exchange radio interface are received by the individual control units of the transmit/receive modules. In addition, voice and data traffic signals from the transmit/receive modules are routed over separate interfaces to the exchange radio interface.

Thereafter, each individual transmitter for control and voice signals is connected to a transmit combiner. The transmit combiner combines all of the input signals onto a signal output coupled through a coaxial cable to the transmit antenna. On the receive side, each of two receive antennas is typically coupled to a respective receive combiner where the signals received are separated according to frequency and passed on to the individual receivers in each of the transmit/receive modules.

The base station handles the radio communication with the cellular telephones. In this capacity, the base station functions chiefly as a relay station for data and voice signals. The base station also supervises the quality of the communications link and monitors or receives signals from the cellular telephones. A typical base station is Model No. RBS882 manufactured by Ericsson Telecom AB Stockholm, Sweden for the GSM digital cellular system. A full description of this analog cellular network is provided in Publication No. EN/LZT 101 908 R2B, published by Ericsson Telecom AB.

Through the cellular radio network, a duplex radio communications signal may be established between two cellular telephones or, between a cellular telephone and a landline telephone. In particular, a communications signal is established by a cellular radio communications system, between two cellular telephones, via a voice channel which is established between the two cellular telephones and the cellular radio network. Upon establishment of a voice channel, the microphone and speaker of the cellular telephone are opened or activated to establish voice communications. Alternatively, a communications signal is established between a cellular telephone and a landline telephone via a voice channel between the cellular telephone, the cellular radio network, an associated public switched telephone network and a telephone associated with the public switched telephone network, such as a landline telephone.

A feature node may also be associated with the mobile telephone switching office of the cellular radio communications system or with another communications network, such as a public switched telephone network. For example, the feature node may be incorporated within or otherwise associated with the Home Location Register of the mobile telephone switching office. Even if the feature node is associated with another communications network, such as a public switched telephone network, the cellular radio network may access the feature node via the interconnection between the mobile telephone switching office of the cellular radio network and the other communication network.

The feature node provides predetermined functions to the cellular telephones or to the telephones associated with the communications network with which the feature node is associated, such as a public switched telephone network. The predetermined functions include, for example, establishing an efficient communications link between telephones, such as via intermediate base stations, or providing voice-control speech information and number translation services as well as facilitating the establishment of conference telephone calls. Still further, a feature node may provide paging services for the user of a cellular telephone and may facilitate the establishment of alternative communications links if the primary communications link is unavailable. For example, a feature node is described in more detail in U.S. patent application Ser. No. 08/561,113 entitled "A Method of Establishing Cooperation With a Functionality" and U.S. Pat. No. 5,539,813, both of which were filed on Feb. 16, 1993 and both of which are incorporated herein by reference.

When a source telephone, such as a cellular telephone or a landline telephone, requests communications with a cellular telephone of a cellular radio communication system, the source telephone and the requested cellular telephone generally perform a predetermined handshaking or verification sequence. The handshaking sequence between the source telephone and the requested cellular telephone is supported by the cellular radio network which individually communicates with both the source telephone and the cellular telephone. Since the handshaking sequence is conventional, it will not be described in detail as it is well known to those skilled in the art.

According to the predetermined handshaking sequence, predefined signals are exchanged between the cellular telephone and the source telephone. For example, the handshaking sequence typically determines if the requested cellular telephone is activated, i.e., if the cellular telephone is turned "on." In addition, the user of the source telephone is generally notified by the handshaking sequence if the cellular telephone is already in use, such as by an audible busy signal. However, a voice channel is not established between the source telephone and the cellular telephone during the handshaking sequence.

If the cellular telephone is activated and is not already in use, the cellular telephone alerts the user, such as by an audible ringing or buzzing sound emitted by the cellular telephone, upon notification of the pending request for communications. Once alerted of a pending request for communications, the user of the cellular telephone, if in the vicinity, may either accept the requested communications, such as by answering the cellular telephone by taking the cellular telephone off-hook, or may ignore the alerting signal.

If the user of the requested cellular telephone answers the request for communications, a voice channel is opened between the source telephone and the cellular telephone. The speaker and microphone of the cellular telephone are also opened or activated. Thus, voice communications are enabled or established, via the opened voice channel, between the cellular telephone and the source telephone in each instance in which the user of the cellular telephone answers the request for communications and a voice channel is opened with the source telephone.

For example, even in instances in which the user of the source telephone only desires to transmit data or a message to a cellular telephone, the speaker and microphone of a conventional cellular telephone of an analog cellular radio network will be opened when the user of the cellular telephone answers the request for communications. Thus, in such instances, voice communications will be unnecessarily established between the source telephone and a conventional cellular telephone.

The user of the cellular telephone is oftentimes in the midst of another important activity, such as driving a vehicle or conversing with another person, when the alerting signal announcing a pending request for communications is emitted. Thus, the user's response to the alert emitted by the cellular telephone, such as by answering the request for communications and conversing with the user of the requesting source telephone, will significantly disrupt the user's present activities. Therefore, a user of a cellular telephone generally only desires to respond to certain higher priority ones of the requests for communications while not responding, at least immediately, to the remaining lower priority requests for communications.

Users of cellular telephones have not generally been able to learn the identity of the source telephone, such as the telephone number assigned to or name associated with the source telephone, without responding to the request and commencing voice communications with the source telephone. Therefore, without responding to the alert of the cellular telephone, users of cellular telephones have not been able to discern if the request was of a relatively high priority to which they desire to respond or if the request was of a relatively low priority to which they do not presently desire to respond.

Instead of either responding to or ignoring the request for communications, the user of the requested cellular telephone would, in some instances, rather transfer the request. By transferring the request, a communications link or voice channel is established between the requesting source telephone and another telephone or an automated answering device, such as an answering machine or an automated voice mail system. However, the user of the requested cellular telephone is not provided the identity of the source telephone. Thus, users must first interrupt their present activities and respond to the request, such as by answering the cellular telephone, prior to transferring the request. Accordingly, cellular telephone users are presently unable to selectively decide, based upon the identity of the source telephone, whether to accept, reject or transfer the request for communications and, if transferred, to decide to which telephone or automated answering device the request for communications should be transferred.

SUMMARY OF THE INVENTION

In view of the foregoing background, it is therefore an object of the present invention to provide an improved cellular telephone.

It is also an object of the present invention to provide an improved cellular telephone and associated method for routing communications.

These and other objects, advantages and features of the present invention are provided by a cellular telephone having a speaker and a microphone and including voice channel establishing means for opening a voice channel between the cellular telephone and a source telephone which has requested communications with the cellular telephone without opening the speaker and the microphone. Thus, a voice channel may be opened between a cellular telephone in a source telephone, while preventing voice communications therebetween.

The cellular telephone also includes delayed speaker and microphone connecting means for receiving and processing modulated data from the source telephone without opening the speaker and the microphone and without establishing voice communications with the source telephone. The delayed speaker and microphone connecting means preferably includes data receiving means for receiving the modulated data via the open voice channel from the source telephone, and demodulating means for processing the received data without opening the speaker and the microphone of the cellular telephone.

The cellular telephone of the present invention may also include voice communications establishing means for opening the speaker and the microphone. Thus, voice communications may be established between the source telephone and the cellular telephone. However, the speaker and the microphone are preferably only opened upon receipt of a predetermined signal by the user of the cellular telephone.

The cellular telephone may also include voice communications routing means for transmitting signals via the opened voice channel indicative of an alternative voice channel to be established with the source telephone. Thus, the user of the cellular telephone is permitted to select the alternative voice channel without opening the speaker and the microphone of the cellular telephone and without ever establishing voice communications with the user of the source telephone.

According to the present invention, the cellular telephone may also include data processing means for determining if the source telephone has requested voice communications with the cellular telephone. In addition, the cellular telephone may include alerting means for notifying the user of the cellular telephone that the source telephone has requested voice communications therewith. However, the speaker and the microphone of the cellular telephone are not opened during the notification process.

In addition, the cellular telephone may include timer means for determining if the cellular telephone has received data from the source telephone, via the open voice channel, within a predetermined time period. If no data has been received within the predetermined time period, the timer means prompts the alerting means such that the user of the cellular telephone is notified that a source telephone has requested voice communications therewith.

The cellular telephone of the present invention may also include display means for displaying information based upon the data processed by the demodulating means. The information displayed may include the identity of the source telephone or a message transmitted by the source telephone. The information is displayed without opening the speaker and the microphone of the cellular telephone. The cellular telephone may also include means for closing the voice channel with the source telephone upon the receipt of a predetermined signal from the source telephone.

In one embodiment of the present invention, the cellular telephone is adapted to communicate with a digital cellular radio network. In this embodiment, the cellular telephone further includes a digital control channel establishing means for opening a digital control channel, in addition to a voice channel, between the cellular telephone and the source telephone. As with the voice channel, the digital control channel is opened without opening the speaker and the microphone of the cellular telephone.

According to the present invention, a voice channel is opened between the cellular telephone and a source telephone without opening the speaker and the microphone of the cellular telephone. Thus, voice communications are not established between the cellular telephone and the source telephone even though a voice channel is opened. Therefore, modulated data may be transmitted, via the open voice channel, to the cellular telephone. This modulated transmitted data is then processed by the cellular telephone without opening the speaker and the microphone to determine if the source telephone has requested voice communications with the cellular telephone. For cellular telephones of a digital cellular radio network, the cellular telephone may include a speech coder for processing the modulated transmitted data.

The modulated data may include, not only a request for voice communications, but also the identity of the source telephone or a message. If the identity of the source telephone is provided, the user of the cellular telephone may determine whether to answer, ignore or transfer the request for communications, based upon the identity of the source telephone, without ever establishing voice communications with the source telephone. If a message is provided, the cellular telephone may display the message for the user without ever opening the speaker and the microphone. Thus, the cellular telephone may effectively function as a cellular paging device.

The cellular telephone of the present invention therefore allows data to be transmitted via an open voice channel between a source telephone and the cellular telephone without opening the speaker and the microphone of the cellular telephone and without establishing voice communications between the source telephone and the cellular telephone. For example, a message or a facsimile transmission may be sent to the cellular telephone via the open voice channel. The identity of the source telephone or the user of the source telephone may also be transmitted to the cellular telephone. If voice communications are requested by the source telephone, the user of the cellular telephone may thus selectively decide whether to accept, ignore or transfer the request based upon the identity of the source telephone.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
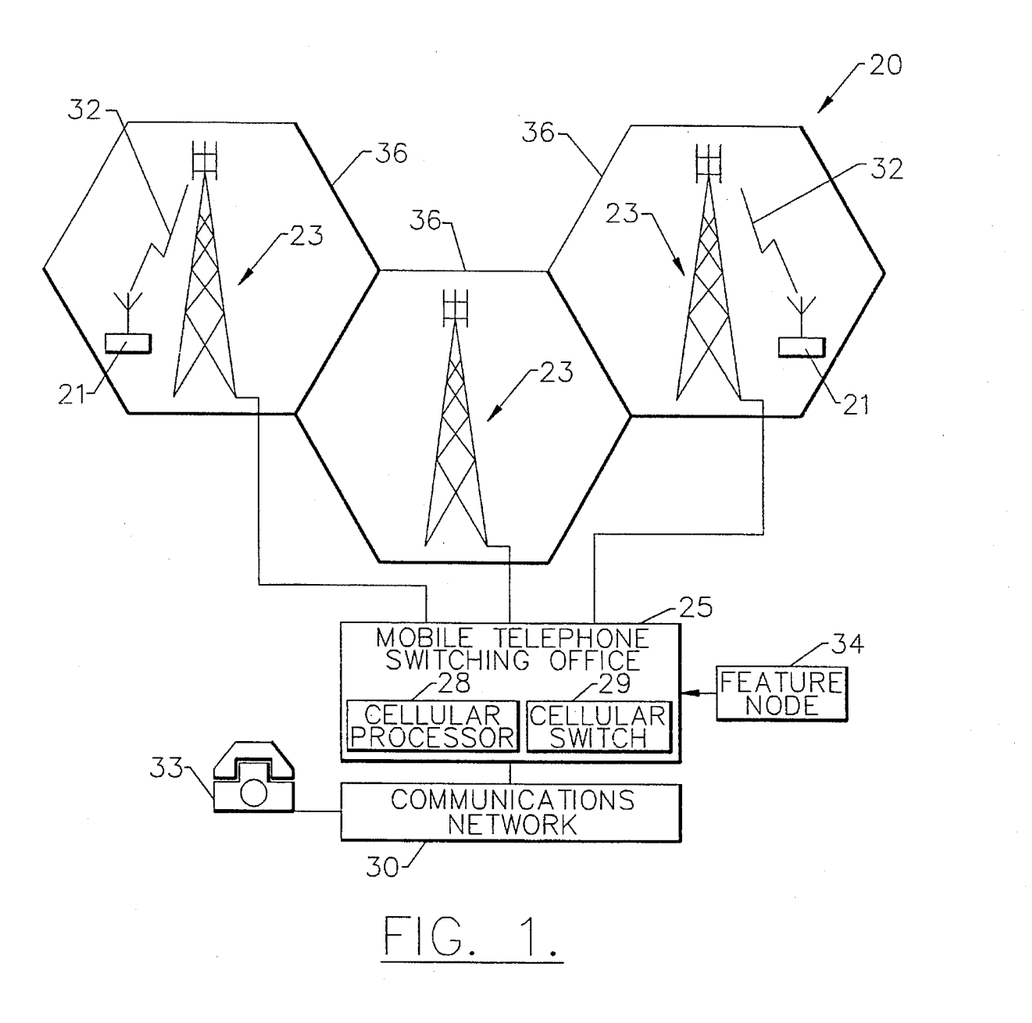
FIG. 1 is a schematic block diagram illustrating the basic components of a cellular radio communications system.

Referring now to FIG. 1, a cellular radio communications system 20 is illustrated. The cellular radio communications system 20 typically includes one or more mobile cellular telephone 21, one or more radio base stations 23 and a mobile telephone switching office 25. The radio base stations 23 and the mobile telephone switching office 25 generally define the cellular radio network. The cellular radio network may be either analog or digital and is divided into regions or cells 36. Each cell 36 includes a base station 23 which is adapted to communicate with the cellular telephones 21 in its cell 36.

As illustrated, the mobile telephone switching office 25 typically includes a cellular processor 28 and a cellular switch 29. The cellular switch 29 of the mobile telephone switching office 25 provides the interface to other associated communications networks 30, such as an associated public switched telephone network. The associated communications network 30 is, in turn, associated with and in communication with one or more telephones, such as the landline telephone 33 illustrated in FIG. 1. Through the cellular radio communications network 20, a duplex radio communications signal 32 may be effected between two cellular telephones 21, or between a cellular telephone 21 and a landline telephone 33. In addition, the mobile telephone switching office 25 and, in particular, the cellular switch 29 may include the Home Location Register for storing data relating to the location and requested services of each subscriber of the cellular radio communications network 20.

As shown in FIG. 1, a feature node 34 may also be associated with the mobile telephone switching office 25 of the cellular radio communications system 20. Although not illustrated, the feature node 34 may also be associated with the communications network 30 so as to provide predetermined functions to both the terminals associated with the communications network 30, such as landline telephone terminals 33, and the cellular terminals 21 associated with the cellular radio network via the interface established between the mobile telephone switching office 25 and the associated communications network 30.

As will be apparent to those skilled in the art, however, the cellular radio communications system 20 need not include a feature node 34 in order to communicate with the cellular telephone 21 of the present invention. However, the association of a cellular telephone 21 of the present invention with a feature node 34 typically permits the cellular terminal to communicate according to the method of the present invention with a wider variety of source telephones, including source telephones which do not include the features of the present invention, since the feature node may provide the necessary intelligence or signalling to support the cellular terminal.

Although the feature node 34 is illustrated as a discrete block in FIG. 1, all or a portion of the feature node 34 may actually be incorporated within the mobile telephone switching office 25 and, in particular, within the Home Location Register of the mobile telephone switching office 25. In addition, while the feature node 34 is shown as a single block in FIG. 1 for purposes of illustration, the feature node 34 may be distributed within the cellular radio communications system 20 without departing from the spirit and scope of the invention. For example, a portion of the feature node 34 may be incorporated within the Home Location Register of the mobile telephone switching office 25 while the remainder of the feature node 34 may be external to, but associated with, the mobile telephone switching office 25. Thus, the feature node 34 may not require a dedicated controller, memory and modem (in analog applications), but may instead share such resources, such as modem pool, with other components of the cellular radio communications system 20.

The cellular telephone 21 of the present invention may be adapted to communicate with either an analog or a digital cellular system. Accordingly, an analog cellular telephone is shown schematically in FIG. 2A and a digital cellular telephone is shown schematically in FIG. 2B.

Figure 2A:
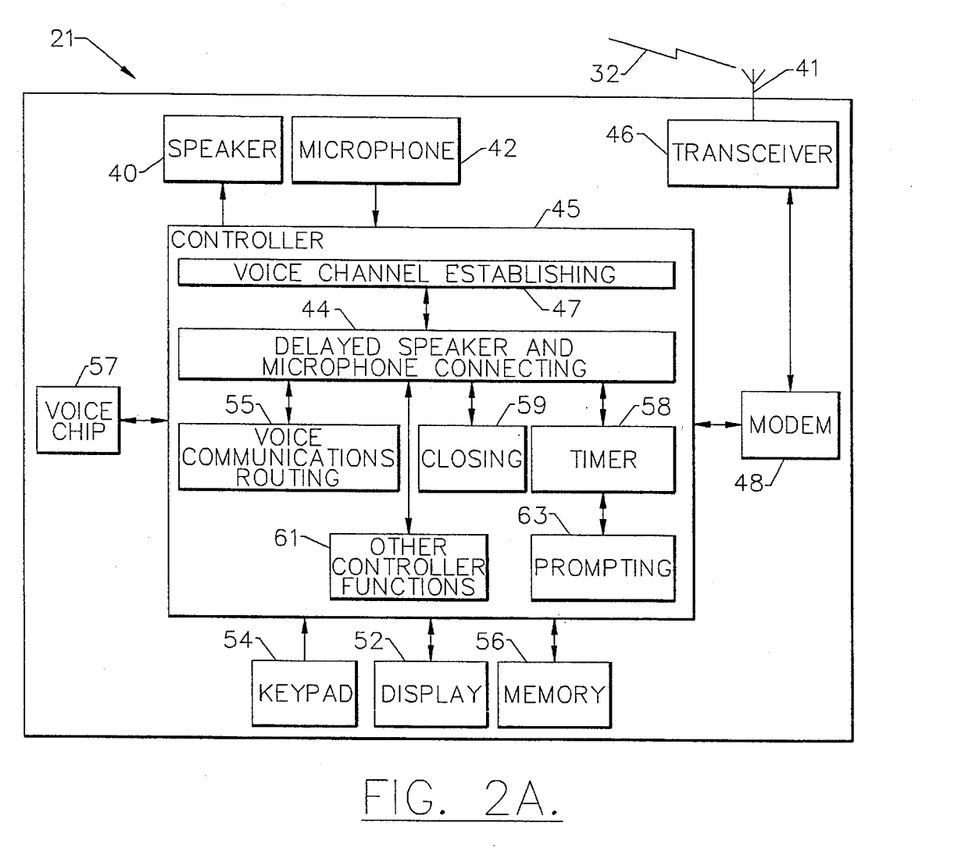
FIGS. 2A and 2B are schematic block diagrams of an analog and a digital cellular telephone, respectively, according to the present invention.
Figure 2B:
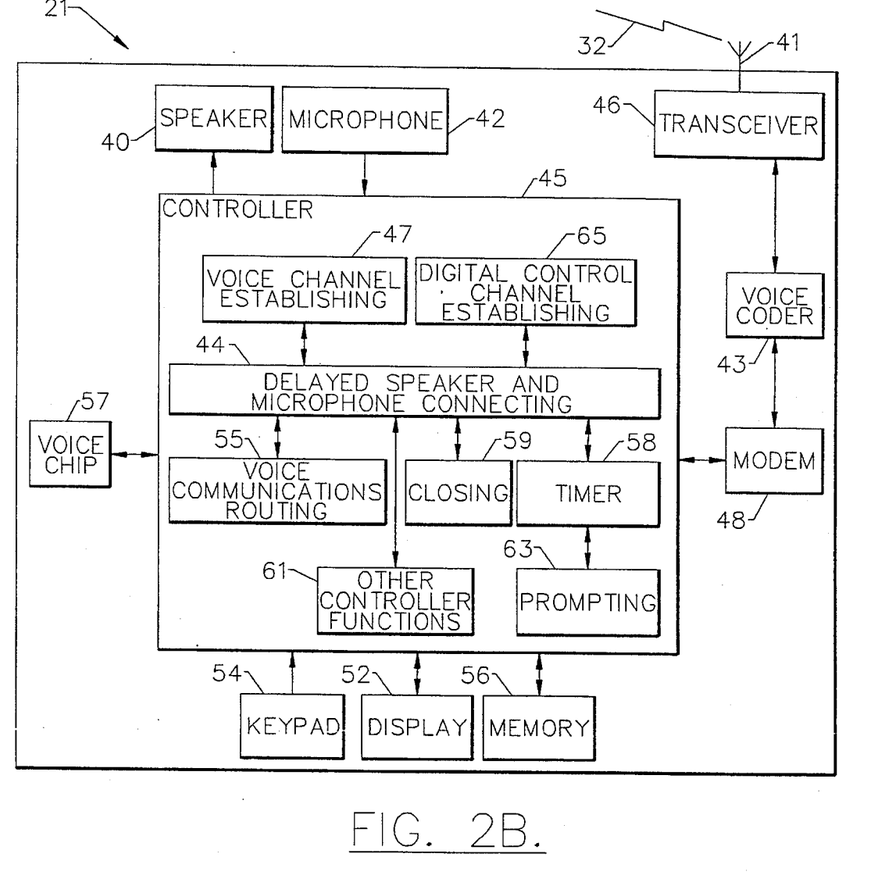

In either embodiment, the cellular telephone 21 of the present invention includes a controller 45, such as a microprocessor or microcontroller, for controlling the operations of the cellular telephone. The cellular telephone 21 also includes a speaker 40 and a microphone 42, operably connected to the controller 45, for transmitting and receiving audible signals, respectively, and for supporting voice communications between the cellular telephone and another telephone.

As schematically illustrated in FIGS. 2A and 2B, the controller 45 of the cellular telephone 21 includes voice channel establishing means 47 for opening a voice channel between the cellular telephone and a source telephone which is requesting communications with the cellular telephone. The voice channel establishing means 47 opens the voice channel with the source telephone without opening the speaker 40 and the microphone 42 of the cellular telephone 21. Thus, voice communications are prevented between the source telephone and the cellular telephone 21 even though a voice channel is opened and data may be transmitted therebetween.

The source telephone may be either another cellular telephone or a landline telephone 33. In addition, the request for communications is typically a telephone call placed by the user of the source telephone. However, the request for communications may also be a request to transmit data, such as a message transmitted to a paging device, a facsimile transmission, an electronic mail message or other types of communications.

The controller 45 of the cellular telephone 21 of the present invention also includes delayed speaker and microphone connecting means 44, responsive to the voice channel establishing means 47, for receiving and processing modulated data from the source telephone via the open voice channel. The receipt and processing of modulated data by the delayed speaker microphone connecting means 44 is also performed without opening the speaker 40 and the microphone 42 and without establishing voice communications between the source telephone and the cellular telephone 21.

Figure 3:
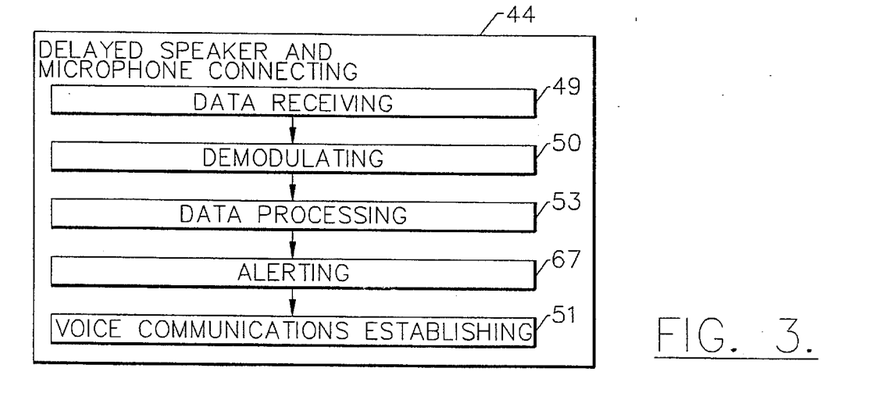
FIG. 3 is a schematic block diagram illustrating operations performed by the delayed speaker and microphone connecting means of a cellular telephone of the present invention.

As illustrated schematically in FIG. 3, the delayed speaker and microphone connecting means 44 preferably includes data receiving means 49, responsive to the voice channel establishing means 47, and demodulating means 50, responsive to the data receiving means. As shown in FIGS. 2A and 2B, the controller 45 and, in particular, the data receiving means 49 operate to control an antenna 41 and an associated RF transceiver 46 that receive modulated data via the open voice channel from the source telephone without opening the speaker 40 and the microphone 42 of the cellular telephone 21. The modulated data that is received is typically transmitted via the open voice channel according to modem signalling, such as via a Dual Tone Multi Frequency ("DTMF") signalling scheme, in analog cellular radio systems.

As illustrated in FIG. 2B, the data receiving means 49 of a digital cellular telephone 21 of the present invention may also operate to control a modem 48 and speech coder 43. As known to those skilled in the art, the speech coder 43 operates to code and decode signals transmitted and received, respectively, via the voice channel of a digital cellular network.

In turn, the demodulating means 50 receives the modulated data from the data receiving means 49 and demodulates or processes the data without opening the speaker 40 and the microphone 42 of the cellular telephone 21. As shown in FIGS. 2A, the demodulating means 50 of an analog cellular telephone 21 typically operates to control a modem 48 that receives and transmits data via the open voice channel according to a predetermined format and rate.

The cellular telephone 21 may therefore open a voice channel with a source telephone without opening the speaker 40 and microphone 42 and without establishing voice communications between the source telephone and the cellular telephone. Data may then be transmitted via the open voice channel between the source telephone and the cellular telephone 21.

This data transmission via the open voice channel which is supported by the cellular telephone 21 of the present invention is distinct from the conventional handshaking sequence performed by a source telephone and a cellular telephone with which the source telephone is requesting communications. As previously explained, the handshaking sequence is a predetermined process which occurs prior to the establishment of a voice channel by which the source telephone determines, among other things, that the cellular telephone is activated. In contrast, the data transmitted via the open voice channel between the source telephone and the cellular telephone 21 of the present invention is transmitted after the voice channel has been opened, even though the speaker 40 and the microphone 42 have not been opened and voice communications are prevented between the source telephone and the cellular telephone 21.

According to the present invention, the delayed speaker and microphone connecting means 44 of the cellular telephone 21 may also include voice communications establishing means 51, responsive to the demodulating means 50, for opening the speaker 40 and the microphone 42 of the cellular telephone to establish voice communications between the cellular telephone and the source telephone. However, the voice communications establishing means 51 only opens the speaker 40 and the microphone 42 of the cellular telephone 21 upon receipt of a predetermined signal by the user of the cellular telephone as explained hereinafter.

As illustrated in FIG. 3, the delayed speaker and microphone connecting means 44 of the cellular telephone 21 of the present invention may also include data processing means 53 for processing the demodulated data. In particular, the data processing means 53 preferably determines if the source telephone has requested voice communications with the cellular telephone 21. For example, the user of the source telephone may have placed a telephone call to the user of the cellular telephone 21.

The controller 45 of the cellular telephone 21 of the present invention may also include alerting means 67, responsive to the data processing means 53, for notifying the user of the cellular telephone that the source telephone has requested voice communications with the cellular telephone. This notification, typically an alarm or other audible signal emitted by the cellular telephone 21, is also provided without establishing voice communications with the source telephone.

As shown schematically in FIGS. 2A and 2B, the cellular telephone 21 may also include display means, such as a visual display 52, for displaying information based upon data processed by the demodulating means. For example, the modulated data transmitted from the source telephone to the cellular telephone 21 may include the identity of the source telephone, such as a telephone number assigned to or a name associated with the source telephone. Thus, the identity of the source telephone, once processed by the demodulating means, may be displayed for the user of the cellular telephone 21.

Accordingly, upon hearing the alerting signal emitted in response to the request for communications by the source telephone, the user of the cellular telephone 21 of the present invention may view the display and determine the identity of the source telephone. Based upon the identity of the source telephone, the user of the cellular telephone 21 may then selectively decide to answer, ignore or transfer the request for communications as explained hereinafter. However, the speaker 40 and microphone 42 are only opened and voice communications are only established with the source telephone once the user of the cellular telephone 21 provides a predetermined signal, such as by depressing the "answer" or "send" button on an alphanumeric keypad 54 of the cellular telephone.

The controller 45 of the cellular telephone 21 also provides other functions to the cellular telephone including the transfer of data to and from a memory device. As shown in FIGS. 2A and 2B, the controller 45 of the cellular telephone 21 of the present invention may also include voice communications routing means 55, responsive to the demodulating means 50, for transmitting signals via the open voice channel indicative of another terminal to which the user of the cellular telephone desires to transfer the request for communications by the source terminal.

An alternative voice channel may then be established between the source telephone and the terminal selected by the user of the requested cellular telephone. For example, for cellular radio communications systems associated with a feature node 34, the feature node initially receives the request for communications from the source telephone. The feature node 34 then notifies the requested cellular telephone 21 of the request and transmits the identity of the source telephone or the user of the source telephone, if provided, to the requested cellular telephone according to the present invention. If the user of the cellular telephone indicates that the request is to be transferred to another terminal, the feature node 34 establishes the communications link or voice channel with the other terminal such that the source telephone may communicate with the other terminal.

Thus, instead of answering the request for communications, the user of the cellular telephone 21 is permitted to transfer the request without ever opening the speaker 40 and the microphone 42 of the cellular telephone and without ever establishing voice communications with the source telephone. In instances in which the identity of the source telephone or the user of the source telephone is provided to and displayed by the cellular telephone 21, the user of the cellular telephone may view the displayed identity and select an alternative voice channel based upon the identity of the source telephone.

For example, the user of the cellular telephone 21 may provide a number, such as a telephone number, that identifies another terminal to which the user of the cellular telephone is transferring the request for communications. The other terminal may include not only another telephone, such as a cellular telephone or a landline telephone, but also an automated answering device, such as an answering machine or a voice mail system.

The user of the cellular telephone 21 may enter the number of the other terminal, such as via the alphanumeric keypad 54 of the cellular telephone, in response to the alerting signal and the displayed identity of the source telephone. The number of the other terminal is then transmitted via the open voice channel to the cellular radio network which establishes the alternative voice channel between the source telephone and the other terminal.

Alternatively, the number of the other terminal to which the user of the cellular telephone 21 is transferring the request for communications may have been previously entered by the user of the cellular telephone and may be stored either within a memory device 56 of the cellular telephone or by the cellular radio network, such as in memory associated with the feature node 34. The stored number may, for example, correspond to the telephone number assigned to the secretary or other co-worker of the user of the cellular telephone 21 who is prepared to respond to such redirected communications.

Thus, the user of the cellular telephone 21 according to the present invention need only provide a predetermined signal, such as the depression of a predetermined button or the entry of a predetermined numerical sequence via the keypad 54, in response to the alerting signal to route the request for communications to the other predetermined terminal. If the number of the other terminal is stored in the memory device 56 of the cellular telephone 21, the stored number is transmitted via the open voice channel upon entry of a predetermined signal by the user of the cellular telephone. Alternatively, if the number of the other terminal is stored by the cellular radio network, such as by the feature node 34 of the cellular radio network, the predetermined signal entered by the user of the cellular telephone is generally transmitted via the open voice channel to the cellular radio network and, in particular, to the feature node 34 of the cellular radio network, which, in turn, establishes the alternative voice channel. Therefore, for cellular radio networks that include a feature node 34, the feature node may establish the alternative voice channel based upon the signals provided by the user of the cellular telephone 21.

Still further, the user's options upon being notified of a request for communications may be menu driven. Thus, the user may respond to the request, such as by transferring the request, by selecting an appropriate entry from the displayed menu.

In addition, upon being alerted to a pending request for communications, the user of the cellular telephone 21 may transmit a message to the user of the source telephone instead of either answering, ignoring or transferring the request. Thereafter, the voice channel may be closed without ever establishing voice communications therebetween. For example, the user of the cellular telephone 21 may enter the message to be transmitted, such as via the keypad 48, upon hearing the alerting signal. Alternatively, as shown in FIGS. 2A and 2B, the cellular telephone 21 of the present invention may include a device 57, typically termed a voice chip, for transmitting a prerecorded message via the open voice channel to the source telephone in response to predetermined signal by the user of the cellular telephone to a pending request for communications once the user of the cellular telephone.

In some instances, the user of the source telephone does not desire to establish voice communications with the cellular telephone 21 but, instead, desires to transmit data to the cellular telephone. For example, the user of the source telephone may wish to send a message to the user of the cellular telephone 21, such as a relatively short message of the type typically transmitted via a paging device. In these instances, the data or message is transmitted via the open voice channel to the cellular telephone 21 which receives and demodulates the data. Information, such as a message, derived from the demodulated data may then be displayed to the user of the cellular telephone 21 by the display means 52.

In instances in which the source telephone transmits data to the cellular telephone without requesting voice communications therewith, the controller 45 of the cellular telephone 21 of the present invention preferably includes means for closing the voice channel 59 upon receipt of a predetermined signal from the source telephone. Thus, upon completion of the data transmission via the open voice channel between the source telephone and the cellular telephone 21, the source telephone may transmit a predetermined signal indicating that the data transmission is completed. Thereafter, the voice channel is closed. As shown in FIGS. 2A and 2B, the voice channel closing means 59 operates to control the transceiver 46 and antenna 41, as well as the modem 48 of an analog cellular telephone, to close the voice channel.

As illustrated in block 61 of FIGS. 2A and 2B, the controller 45 of the cellular telephone 21 provides a variety of other functions to the cellular telephone 21. For example, the controller 45 controls the flow of data to and from the associated memory device 56. The controller also provides an interface with the display 52, keypad 54, speaker 40 and microphone 42 as shown in FIGS. 2A and 2B.

The cellular telephone 21 of the present invention is adapted to communicate with various types of source telephones. Thus, the cellular telephone 21 is adapted to communicate, not only with source telephones that are adapted to provide identifying data signals via the open voice channel or that are communicably connected to the cellular telephone via a feature node 34 that provides such data signals, but also with source telephones that are not adapted to provide data signals and that are not communicably connected to the cellular telephone via a feature node. For example, the source telephone may be a landline telephone which has not been adapted to transmit such signals.

Therefore, the controller 45 of the cellular telephone 21 may include timer means 58, such as a timer associated with the demodulating means 50, for determining if the cellular telephone has received data from the source telephone within a predetermined time period after the opening of the voice channel. The time period may set, such as by the user of the cellular telephone 21 or the designer of the cellular radio network, to any desired value. However, the time period is typically between about 2 seconds and 4 seconds. While the timer 58 is included within the controller 45 of the embodiment of the cellular telephone 21, the timer may be a separate component of the cellular telephone without departing from the spirit and scope of the present invention.

The controller 45 of the cellular telephone 21 of the present invention may also include means 63, responsive to the timer means 58, for prompting the source telephone, within the predetermined time period, to provide data signals, such as data identifying the source telephone. If no data is received within the predetermined time period, the timer means 58 may also prompt the alerting means 67 such that the user of the cellular telephone 21 is notified that a source telephone has requested voice communications therewith. However, the user of the cellular telephone 21 is not provided with the identity of the source telephone or any other data from the source telephone.

The cellular telephone 21 of the present invention is adapted to communicate both with an analog and a digital cellular radio network. For a cellular telephone 21 according to the present invention that is adapted to communicate with a digital cellular radio network, the controller 45 of the cellular telephone may also include a digital control channel establishing means 65 for opening a digital control channel between the cellular telephone and the digital cellular radio network.

Thus, in one embodiment of this invention, both a voice channel and a digital control channel are opened without opening the speaker 40 and the microphone 42 of the cellular telephone 21 and without establishing voice communications between the cellular telephone and the source telephone. In this embodiment, even though the digital control channel is opened, the cellular telephone 21 of the present invention may transmit and receive modulated data via the open voice channel according to a predetermined modem signalling scheme as described hereinabove.

In another embodiment of this invention, only the digital control channel is opened between the cellular telephone and the source telephone to transmit and receive data according to the predetermined signalling scheme described above. However, in this embodiment, the speaker 40 and the microphone 42 are not opened and voice communications are not established until the user of the cellular telephone provides a predetermined signal. Once the predetermined signal is provided, the voice channel between the cellular telephone and the source telephone, the speaker 40 and the microphone 42 may be opened and voice communications may be established.

Each cellular telephone 21 of a cellular radio communications network 20 need not include or be associated with the voice channel establishing means 47, the delayed speaker and microphone connecting means 44, the digital control channel establishing means 65 and the communications routing means 55 features since users of cellular telephones 21 which include or are associated with such features generally pay an additional fee for the features. Instead, the cellular radio communications system 20 may be configured such that only predetermined ones of the cellular telephones 21 include or utilize these features. Thus, only those users who desire to receive data or messages without establishing voice communications or who desire to know the identity of the source telephone which is requesting communications with them prior to responding to or transferring the request, may select to utilize, and therefore pay for, these features.

In addition, the user of a cellular telephone 21 who has selected these features may subsequently remove these features if, for example, the user is not frequently utilizing the features. Alternatively, the user of a cellular telephone who has not initially selected these features may subsequently select or add these features as desired.

As explained, a source telephone initially requests communications with the cellular telephone 21. The request is generally routed via a cellular radio communications system 20 which may, but need not necessarily, include a feature node 34. In addition, the source telephone may, but need not necessarily, support data transmission via the open voice channel as explained previously.

Figure 4:
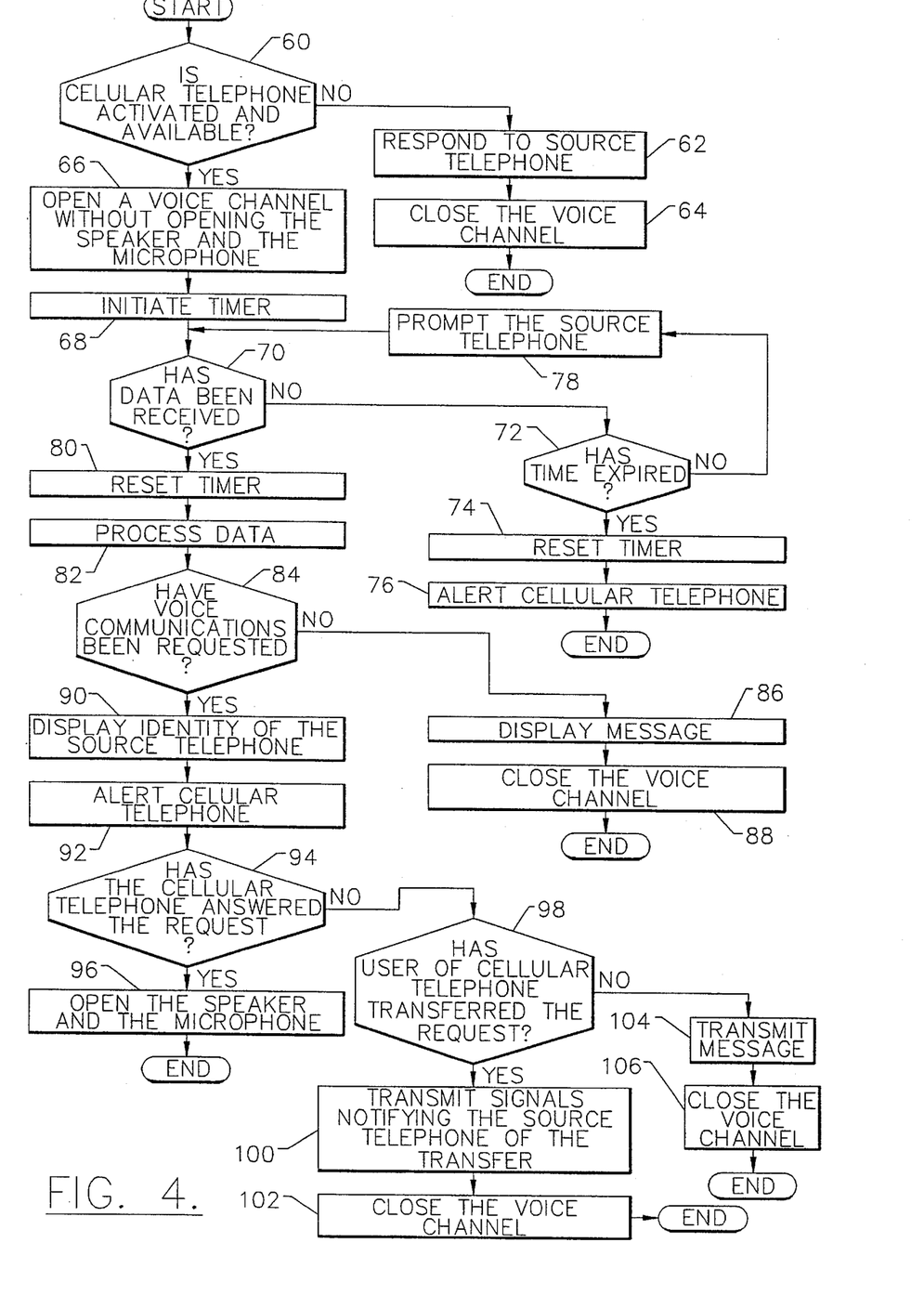
FIG. 4 is a detailed flow chart which illustrates operations performed by a cellular telephone according to the present invention upon receiving a request for communications from a source telephone.

As illustrated in block 60 of FIG. 4 which illustrates one embodiment of the operations of the cellular telephone 21 of the present invention, the source telephone and the cellular telephone initially exchange signals via the cellular radio network according to a conventional handshaking sequence with the source telephone to determine if the cellular telephone is activated and available. If the cellular telephone 21 is not activated, is already in use or is otherwise unavailable, a predetermined response, i.e., a busy signal or a prerecorded message, such as "the requested telephone is temporarily unavailable", may be transmitted to the source telephone as shown in block 62. Thereafter, the voice channel is closed as illustrated in block 64.

Alternatively, the request for communications by the source telephone may be transferred to an automated answering device to transmit a prerecorded message and record any response of the user of the source telephone. In one embodiment, the feature node 34 of the cellular radio communications system transfers or redirects the request to an automated answering device that has previously been identified by the user of the cellular telephone 21. Thereafter, upon becoming activated or available, the cellular telephone 21 may produce an alerting signal and/or display a message indicating that a message has been recorded and is awaiting the user of the cellular telephone such that the user of the cellular telephone may access the recorded message at their convenience.

If the cellular telephone 21 is activated and available, a voice channel is opened between the cellular telephone and the source telephone without opening the speaker 40 and the microphone 42 as shown in block 66. Although an open voice channel for transmitting signals is described hereinafter, the digital control channel may be opened in addition to or instead of the voice channel for cellular telephones associated with a digital cellular radio network without opening the speaker 40 and the microphone 42 of the cellular telephone 21, as previously described.

The voice channel is opened or established between the source telephone and the cellular telephone in a conventional manner as known to those skilled in the art and, accordingly, will not be described further herein. However, in marked contrast to the conventional method of opening a voice channel in which the speaker and the microphone of the cellular telephone are automatically opened, the speaker 40 and microphone 42 of the cellular telephone 21 of the present invention are not opened when the voice channel is opened. Thus, voice communications are prevented between the source telephone and the cellular telephone 21.

As illustrated in blocks 68 and 70, a timer 58 is then initiated and the cellular telephone 21 monitors the open voice channel to determine if data has been received from the source telephone. If data has not been received and the time has expired, the timer 58 is reset and the cellular telephone 21 is alerted of the pending request for communications, such as that from a landline telephone which is not adapted to transmit data signals, as shown in blocks 72, 74 and 76.

If the time has not expired, but no data has been received, the cellular telephone 21 may prompt the source telephone to provide data, such as an identification of the source telephone, as shown in block 78. The cellular telephone 21 then continues to monitor the open voice channel to determine if data has been received from the source telephone. If data is received from the source telephone, the timer 58 is reset and the data is demodulated and processed as illustrated in blocks 80 and 82. Based on the processed data, the cellular telephone 21 then determines if the source telephone has requested voice communications with the cellular telephone as shown in block 84.

If the source telephone has not requested voice communications with the cellular telephone 21 but, instead, has transmitted data, such as a message, to the cellular telephone, the cellular telephone displays the message, such as via the visual display 52, and closes the voice channel as shown in blocks 86 and 88, respectively. Accordingly, the cellular telephone 21 of the present invention may perform the function of a cellular paging device.

If the source telephone has requested voice communications with the cellular telephone 21 and has identified itself, the identity of the source telephone is displayed and the cellular telephone is alerted as illustrated in blocks 90 and 92, respectively. If the user of the cellular telephone 21 answers the cellular telephone in response to the alert, the speaker 40 and the microphone 42 of the cellular telephone are opened and voice communications are established, via the open voice channel, between the cellular telephone and the source telephone as shown in blocks 94 and 96, respectively.

Alternatively, if the user of the cellular telephone 21 does not answer the alert, the cellular telephone determines if the user has transferred the request as illustrated in block 98. As described above, the user may provide a signal indicative of an alternative voice channel to be established with the source telephone. If the user of the cellular telephone 21 transfers a request, the signal indicative of the alternative voice channel to be established with the source telephone is transmitted via the voice channel and the voice channel is then closed as shown in blocks 100 and 102, respectively. If the user of the cellular telephone 21 has not transferred the request and has not answered the alert within a predetermined time period, a message, such as "the called party is not responding", may be transmitted to the source telephone via the voice channel as illustrated in block 104. Alternatively, the request may be automatically transferred to an automated answering service, such as a voice mail system. Thereafter, the user of the source telephone will typically terminate the request for communications, i.e. hang up the source telephone by placing the source telephone on-hook, after a period of time and the voice channel will be closed as shown in block 106.

Thus, according to the present invention, a voice channel is opened between the cellular telephone 21 and a source telephone without opening the speaker 40 and the microphone 42 of the cellular telephone. Voice communications are therefore prevented between the cellular telephone 21 and the source telephone even though a voice channel is opened and data transmission between the source telephone and the cellular telephone is supported. The data transmitted via the open voice channel may include, not only a request for voice communications, but also data, such as the identity of the source telephone or a message.

If the identity of the source telephone is provided, the user of the cellular telephone 21 may selectively determine whether to answer, ignore or transfer the request for communications, based upon the displayed identity of the source telephone, without ever establishing voice communications with the source telephone. Accordingly, the user of a cellular telephone 21 need not blindly accept or reject incoming requests for communications, such as telephone calls, but may, instead, selectively accept or route those incoming requests so as to only respond to or answer those incoming requests which the user selects. Therefore, the other activities which the user of the cellular telephone 21 may be performing, such as driving or conversing with another person, may be continued with fewer interruptions since the user may only select to respond to requests having a relatively high priority.

Furthermore, if a message is provided via the open voice channel, the cellular telephone 21 may display the message for the user without ever opening the speaker 40 and the microphone 42. Thus, the cellular telephone 21 may effectively function as a cellular paging device.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed:

1. A cellular telephone comprising:

a speaker;

a microphone;

voice channel establishing means for opening a voice channel between the cellular telephone and a source telephone requesting communications with the cellular telephone without opening said speaker and said microphone of the cellular telephone such that voice communications are prevented between the source telephone and the cellular telephone;

data receiving means, responsive to said voice channel establishing means, for receiving modulated data via the open voice channel from the source telephone without opening said speaker and said microphone of the cellular telephone;

demodulating means, responsive to said data receiving means, for processing the received data without opening said speaker and said microphone of the cellular telephone;

user input means for accepting user input of an alternative terminal identifier after receipt of the identity of the source telephone, wherein said alternative terminal identifier identifies an alternative terminal other than the cellular telephone;

voice communications routing means, responsive to said demodulating means and said user input means, for transmitting signals via the open voice channel indicative of the alternative terminal other than the cellular telephone and for transferring the communications request to the alternative terminal other than the cellular telephone such that the user of the cellular telephone is permitted to select the alternative terminal other than the cellular telephone based upon the identity of the source telephone without opening said speaker and said microphone and without establishing voice communications with the source telephone;

data processing means, responsive to said demodulating means, for determining if the source telephone has requested voice communications with the cellular telephone;

alerting means, responsive to said data processing means, for notifying the user of the cellular telephone, without establishing voice communications with the source telephone, that the source telephone has requested voice communications with the cellular telephone; and timer means, associated with said demodulating means, for determining if the cellular telephone has received data from the source telephone within a predetermined time period after opening of the voice channel and, if no data is received within the predetermined time period, for prompting said altering means such that the user of the cellular telephone is notified that the source telephone has requested voice communications therewith.

2. The cellular telephone according to claim 1 further comprising voice communications establishing means, responsive to said demodulating means, for opening said speaker and said microphone to thereby establish voice communications between the source telephone and the cellular telephone only upon receipt of a predetermined signal by the user of the cellular telephone.

3. The cellular telephone according to claim 1 further comprising display means for displaying information based upon the data processed by said demodulating means wherein the information displayed includes the identity of the source telephone.

4. The cellular telephone according to claim 1 further comprising display means for displaying information based upon the data processed by said demodulating means wherein the information displayed includes a message transmitted by the source telephone.

5. The cellular telephone according to claim 1 further comprising means, responsive to said demodulating means, for closing the voice channel upon the receipt of a predetermined signal from the source telephone.

6. The cellular telephone according to claim 1 wherein the cellular telephone is adapted to communicate with a digital cellular radio network, the cellular telephone further comprising a digital control channel establishing means for opening a digital control channel between the cellular telephone and the source telephone without opening the speaker and the microphone of the cellular telephone.

7. A cellular telephone having a speaker and a microphone, the cellular telephone comprising:

voice channel establishing means for opening a voice channel between the cellular telephone and a source telephone requesting communication with the cellular telephone without opening the speaker and the microphone of the cellular telephone such that voice communications are prevented between the source telephone and the cellular telephone;

data receiving means, responsive to said voice channel establishing means, for receiving modulated data via the open voice channel from the source telephone without opening the speaker and the microphone of the cellular telephone, wherein the modulated data includes the identity of the source telephone;

demodulating means, responsive to said data receiving means, for processing the received data without opening the speaker and the microphone of the cellular telephone;

user input means for accepting user input of an alternative terminal identifier after receipt of the identity of the source telephone, wherein said alternative terminal identifier identifies an alternative terminal other than the cellular telephone;

voice communications routing means, responsive to said demodulating means and said user input means, for transmitting signals via the open voice channel indicative of the alternative terminal other than the cellular telephone and for transferring the communications request to the alternative terminal other than the cellular telephone such that the user of the cellular telephone is permitted to select the alternative terminal other than the cellular telephone based upon the identity of the source telephone without opening the speaker and the microphone and establishing voice communications with the source telephone;

data processing means, responsive to said demodulating means, for determining if the source telephone has requested voice communications with the cellular telephone;

altering means, responsive to said data processing means, for notifying the user of the cellular telephone, without establishing voice communications with the source telephone, that the source telephone has requested voice communications with the cellular telephone; and timer means, associated with said demodulating means, for determining if the cellular telephone has received data from the source telephone within a predetermined time period after opening of the voice channel and, if no data is received within the predetermined time period, for prompting said alerting means such that the user of the cellular telephone is notified that the source telephone has requested voice communications therewith.

8. The cellular telephone according to claim 7 further comprising voice communications establishing means, responsive to said demodulating means, for opening the speaker and the microphone to thereby establish voice communications between the source telephone and the cellular telephone only upon receipt of a predetermined signal by the user of the cellular telephone.

9. A cellular telephone having a speaker and a microphone, the cellular telephone comprising:

voice channel establishing means for opening a voice channel between the cellular telephone and a source telephone requesting communications with the cellular telephone without opening the speaker and the microphone;

delayed speaker and microphone connecting means, responsive to said voice channel establishing means, for receiving and processing modulated data from the source telephone via the open voice channel, without opening the speaker and the microphone and without establishing voice communications with the source telephone;

user input means for accepting user input of an alternative terminal identifier after receipt of the modulated data, wherein said alternative terminal identifier identifies an alternative terminal other than the cellular telephone;

voice communications routing means, responsive to said delayed speaker and microphone connecting means and said user input means, for transmitting signals via the open voice channel indicative of the alternative terminal other than the cellular telephone and for transferring the communications request to the alternative terminal other than the cellular telephone such that the user of the cellular telephone is permitted to select the alternative terminal other than the cellular telephone based upon the identity of the source telephone without opening the speaker and the microphone and establishing voice communications with the source telephone;

wherein said delayed speaker and microphone connecting means further comprises data processing means for determining if the source telephone has requested voice communications with the cellular telephone;

altering means, responsive to said data processing means, for notifying the user of the cellular telephone, without establishing voice communications with the source telephone, that the source telephone has requested voice communications with the cellular telephone; and timer means, associated with said demodulating means, for determining if the cellular telephone has received data from the source telephone within a predetermined time period and, if no data is received within the predetermined time period, for prompting said altering means such that the user of the cellular telephone is notified that the source telephone has requested voice communications therewith.

10. The cellular telephone according to claim 9 wherein said delayed speaker and microphone connecting means comprises:

data receiving means for receiving modulated data via the open voice channel from the source telephone without opening the speaker and the microphone of the cellular telephone, wherein the modulated data includes the identity of the source telephone;

demodulating means for processing the received data without opening the speaker and the microphone of the cellular telephone.

11. The cellular telephone according to claim 9 wherein said delayed speaker and microphone connecting means further comprises voice communications establishing means for opening the speaker and the microphone to thereby establish voice communications between the source telephone and the cellular telephone only upon receipt of a predetermined signal by the user of the cellular telephone.

12. A method of transmitting data between a cellular telephone and a source telephone requesting communication with the cellular telephone without establishing voice communications therebetween, the method comprising the steps of:

opening a voice channel between the cellular telephone and the source telephone without opening the speaker and the microphone of the cellular telephone such that voice communications is not established therebetween;

transmitting modulated data from the source telephone to the cellular telephone via the open voice channel without opening the speaker and the microphone of the cellular telephone;

processing the transmitted data without opening the speaker and the microphone of the cellular telephone to determine if the source telephone has requested voice communications with the cellular telephone;

accepting user input of an alternative terminal identifier after receipt of the modulated data, wherein said alternative terminal identifier identifies an alternative terminal other than the cellular telephone;

transmitting signals via the open voice channel, after said processing and accepting steps, wherein the signals are indicative of the alternative terminal other than the cellular telephone;

transferring the communication request to the alternative terminal other than the cellular telephone such that the user of the cellular telephone is permitted to select the alternative terminal other than the cellular telephone based upon the identity of the source telephone without opening said speaker and microphone and establishing voice communications with the source telephone;

wherein said processing step comprises the step of determining if the cellular telephone has received data from the source telephone within a predetermined time period; and wherein said method further comprises the step of alerting the user of the cellular telephone, if no data is received within the predetermined time period, that the source telephone has requested voice communications therewith without opening the speaker and microphone of the cellular telephone.

13. The method of transmitting data between a cellular telephone and a source telephone according to claim 12 wherein said processing step is followed by the step of opening the speaker and the microphone of the microphone to thereby establish voice communications between the source telephone and the cellular telephone only upon receipt of a predetermined signal by the user of the cellular telephone.

14. The method of transmitting data between a cellular telephone and a source telephone according to claim 12 further comprising the step of alerting a user of the cellular telephone, after said processing step, that the source telephone has requested voice communications therewith without establishing voice communications with the source telephone.

15. The method of transmitting data between a cellular telephone and a source telephone according to claim 12 further comprising the step of displaying the data received by the cellular telephone after the processing step wherein the displayed data includes the identity of the source telephone.

16. The method of transmitting data between a cellular telephone and a source telephone according to claim 12 further comprising the step of displaying the data received by the cellular telephone after the processing step wherein the displayed data includes a message transmitted by the source telephone.

* * * * *